United States Patent
Amini et al.

(10) Patent No.: US 12,439,370 B2
(45) Date of Patent: Oct. 7, 2025

(54) AUTOMATED POSITION ESTIMATION BASED ON COORDINATING ACCESS POINTS

(71) Applicant: Cisco Technology, Inc., San Jose, CA (US)

(72) Inventors: Peiman Amini, Fremont, CA (US); Ardalan Alizadeh, San Jose, CA (US); Bahador Amiri, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 399 days.

(21) Appl. No.: 18/068,378

(22) Filed: Dec. 19, 2022

(65) Prior Publication Data

US 2024/0205873 A1    Jun. 20, 2024

(51) Int. Cl.
*H04W 64/00* (2009.01)
*G01S 5/00* (2006.01)
*G01S 5/02* (2010.01)

(52) U.S. Cl.
CPC ......... *H04W 64/003* (2013.01); *G01S 5/0081* (2013.01); *G01S 5/02213* (2020.05)

(58) Field of Classification Search
CPC ... H04W 64/003; H04W 64/00; H04W 4/029; H04W 4/02; H04W 4/021; H04W 88/08;
(Continued)

(56) References Cited

U.S. PATENT DOCUMENTS

| | | | |
|---|---|---|---|
| 2005/0186972 A1* | 8/2005 | Ogino | H04W 16/18 455/457 |
| 2006/0052115 A1* | 3/2006 | Khushu | H04W 64/00 455/456.3 |

(Continued)

FOREIGN PATENT DOCUMENTS

| | | |
|---|---|---|
| CN | 105357647 | 2/2016 |
| CN | 110022574 A | 7/2019 |

OTHER PUBLICATIONS

Fang et al., "Accurate Indoor Location Estimation by Incorporating the Importance of Access Points in Wireless Local Area Networks," IEEE Globecom 2010, pp. 1-5.
(Continued)

*Primary Examiner* — Nimesh Patel
(74) *Attorney, Agent, or Firm* — Polsinelli P.C.

(57) ABSTRACT

Disclosed are systems, apparatuses, methods, and computer-readable media for identifying a locations of a network entities within a network. A method for identifying a location of an (AP) includes receiving a first location measurement associated with a first measurement variant and a second location measurement associated with a second measurement variant from a first AP; receiving a third location measurement associated with the first measurement variant and a fourth location measurement associated with the second measurement variant from a second AP; determining weights associated with the location measurements; determining a first location associated with the first AP and a second location associated with the second AP based on a first weight, a second weight, a third weight, and a fourth weight; determining a confidence of the first location based on a comparison of the first location measurement and the second location measurement.

20 Claims, 9 Drawing Sheets

(58) Field of Classification Search
CPC ..... H04W 84/12; H04W 4/023; H04W 84/18; H04W 24/10; H04W 84/045; H04W 4/025; H04W 12/63; H04W 36/322; G01S 5/0081; G01S 5/02213; G01S 13/765; G01S 5/011; G01S 5/0244; G01S 5/0289; G01S 19/48; G01S 5/0242; G01S 5/0278; G01S 5/0236; G01S 5/04; G01S 5/02585; G01S 5/0009; G01S 5/06; G01S 5/0257; G01S 19/51; G01S 5/10; G01S 5/14; G01S 5/021; G01S 19/42; G01S 5/12; G01S 5/02; G01S 5/0036; G01S 5/0018; G01S 19/40; G01S 2205/008; G01S 19/45; G01S 5/0054; G01S 19/07; G01S 5/0284; G01S 5/00; G01S 19/073; G01S 19/396; G01S 19/252; G01S 19/33; G01S 11/04; G01S 1/02; G01S 5/02695; G01S 15/08; G01S 5/20; Y02D 30/70; G06N 3/045; G06N 3/0499; G06N 20/00; G06N 3/084; G06N 7/01; G06N 3/0464; G06N 3/047; G06N 3/049; G06N 3/08
See application file for complete search history.

(56) References Cited

U.S. PATENT DOCUMENTS

| | | | |
|---|---|---|---|
| 2013/0307723 A1 | 11/2013 | Garin et al. | |
| 2015/0099538 A1 | 4/2015 | Wang et al. | |
| 2017/0026804 A1 | 1/2017 | Tsai et al. | |
| 2017/0311125 A1* | 10/2017 | Hedley | G01S 5/0289 |
| 2018/0310133 A1* | 10/2018 | Ramasamy | G01S 19/48 |
| 2019/0069263 A1* | 2/2019 | Ylamurto | H04W 64/003 |
| 2020/0408927 A1* | 12/2020 | Youssef | H04B 17/318 |
| 2021/0227489 A1 | 7/2021 | Henry et al. | |
| 2022/0099789 A1* | 3/2022 | Abrudan | G01S 5/0289 |
| 2022/0132461 A1* | 4/2022 | Matsumoto | G01S 5/12 |
| 2022/0390614 A1* | 12/2022 | Ganu | G01S 19/48 |

OTHER PUBLICATIONS

International Search Report and Written Opinion for International Application No. PCT/US2023/084565, mailed May 8, 2024, 15 Pages.

* cited by examiner

AUTOMATED POSITION ESTIMATION BASED ON COORDINATING ACCESS POINTS

TECHNICAL FIELD

The disclosure relates generally to communication networks and, more specifically but not exclusively, to automated position estimation based on coordinating access points.

DESCRIPTION OF THE RELATED TECHNOLOGY

Wireless communications systems provide various types of communications, content, and service to people around the globe. These systems, which can support communications with multiple users by sharing the time, frequency, and spatial resources of a wireless medium, can include code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). These multiple access technologies have been adopted in various telecommunication standards to provide a common protocol that enables different wireless devices to communicate on a municipal, national, regional, and even global level.

One example wireless communications standard is 5G NR, which is part of a continuous mobile broadband evolution promulgated by the Third Generation Partnership Project (3GPP) to meet new requirements associated with latency, reliability, security, scalability, and other requirements. Another example wireless communications standard is the IEEE 802.11 family of wireless communications standards, which governs the operation of wireless local area networks (WLANs), more commonly known as Wi-Fi networks. Various wireless devices can be used to perform location estimation within indoor and outdoor environments.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and + explained with additional specificity and detail through the use of the accompanying drawings in which.

DETAILED DESCRIPTION

Figure 1:
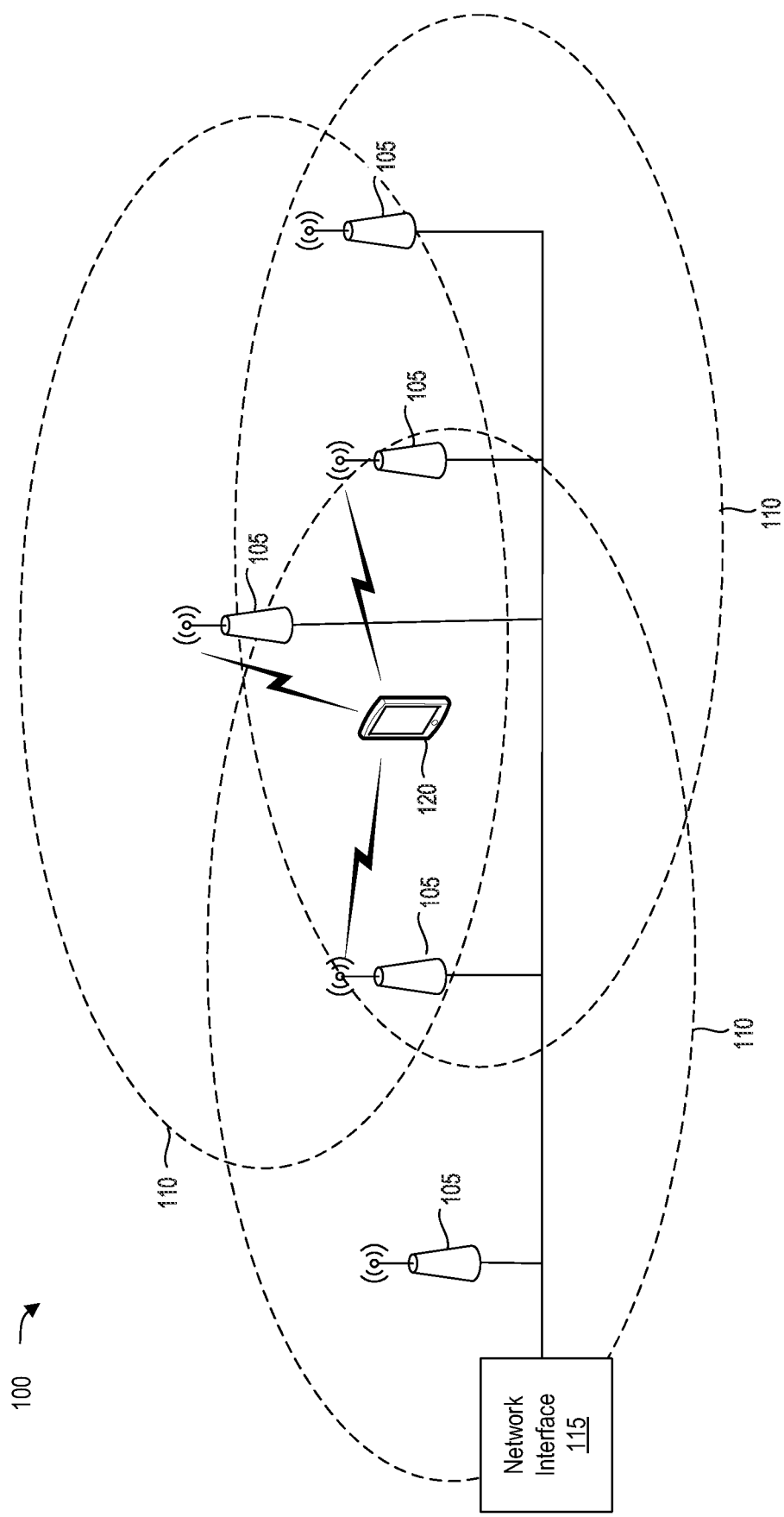
FIG. 1 illustrates an example of a network environment for estimating a location of an object in accordance with some aspects of the disclosure.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

In some examples, systems and techniques are described for automated position estimation based on coordinating access points.

Disclosed are systems, apparatuses, methods, computer readable medium, and circuits for automated position estimation based on coordinating access points. According to at least one example, a method of a determining a location of an access point includes receiving a first location measurement associated with a first measurement variant and a second location measurement associated with a second measurement variant from a first AP; receiving a third location measurement associated with the first measurement variant and a fourth location measurement associated with the second measurement variant from a second AP; determining a first weight associated with the first location measurement, a second weight associated with the second location measurement, a third weight associated with the third location measurement, and a fourth weight associated with the fourth location measurement; determining a first location associated with the first AP and a second location associated with the second AP based on the first weight, the second weight, the third weight, and the fourth weight; determining a confidence of the first location based on a comparison of the first location measurement and the second location measurement; identifying a trigger to perform to additional location measurements of the first AP and the second AP; and performing the additional location measurements of the first AP and the second AP based on the trigger.

In some aspects, a position of an object relative to network entities can be estimated using a reference signal. Estimating the position of an object relative to network entities can consume a significant amount of resources based on the identification of discrete distances between the objects due to the number of measurements that are required to minimize errors and improve accuracy. In some cases, location estimation can become infeasible due to high bandwidth use, for example, during a popular sporting event or other large gatherings.

In some aspects, adding a network entity to a network may require the input of network information and position information, which can be laborious process based on the network entity not having a dedicated input mechanism. A generic interface such as an app on a mobile phone can assist but requires that a mobile device to connect to that network entity using a specialized interface and a specialized application. While the generic interface is useful if that interface is frequently used, infrequently used generic interfaces, such as through the specialized application, are frequently more frustrating as a result of forming a wireless connection with the network entity.

Example Embodiments

The following description is directed to certain implementations for the purposes of describing innovative aspects of various embodiments. However, a person having ordinary skill in the art will readily recognize that the teachings herein can be applied in a multitude of different ways. The described implementations can be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

Examples are described herein in the context of systems and methods for location estimation that is automated based on multiple location measurements. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

Aspects are described herein in the context of systems and methods for location estimation based on different types of measurements of neighboring access points.

Location estimation refers to the ability to coordinate devices to identify a position of an object based on various measurements, such as time of flight (ToF), angle of arrival (AoA), time delay of arrival (TDoA), angle of departure (AoD), carrier phase measurement and other various similar measurements. Based on the various measurements at various devices, the location of an object can be identified. Previous location estimation techniques have limited accuracy to within several meters and limited use of techniques to larger objects such as vehicles, transit, and other outdoor environments. Location estimation can be useful in more scenarios when accuracy is improved and use cases are expanded to include indoor positioning. For example, a misplaced electronic device can be located when the accuracy is improved to decimeters or centimeters. More accurate location estimation has additional uses in many other industries, such as manufacturing, construction, food services, medical services, building automation, and so forth.

Location estimation can be implemented in wireless communication devices for various purposes, which is also referred to as fine tune measurement (FTM) for indoor and outdoor positioning, by using a round trip time (RTT) between two devices. The distance between the devices is half of the RTT divided by the speed of light or c, and a device can be positioned based on the determination of distances from multiple fixed locations. The accuracy of a single RTT is generally not very high due to noise, multipath, quantization error, drift, and other parasitic effects. Various techniques exist to improve the accuracy of the RTT determination, such as using AoA to determine phase information of a reference signal transmitted by the entity. One example of a technique to improve the accuracy of the RTT determination is by performing multiple RTT determinations at different frequencies to eliminate errors in RTT measurements.

In conventional cases, the AP receives input related to location information that enables the AP to determine an absolute location. This process can be difficult because the AP does not provide a specific user interface (UI) for providing the information and a generic interface must be utilized to provide this information. However, connecting to the generic interface can be convoluted to directly access the AP using an interface. Further, accurate information must be entered into the generic interface and humans are inaccurate at entering a long sequence of numbers to specifically identify an AP.

The subject technology relates to improving measurement techniques for location estimation. In one illustrative aspect, the method includes receiving a first location measurement associated with a first measurement variant and a second location measurement associated with a second measurement variant from a first AP; receiving a third location measurement associated with the first measurement variant and a fourth location measurement associated with the second measurement variant from a second AP; determining a first weight associated with the first location measurement, a second weight associated with the second location measurement, a third weight associated with the third location measurement, and a fourth weight associated with the fourth location measurement; determining a first location associated with the first AP and a second location associated with the second AP based on the first weight, the second weight, the third weight, and the fourth weight; determining a confidence of the first location based on a comparison of the first location measurement and the second location measurement; identifying a trigger to perform to additional location measurements of the first AP and the second AP; and performing the additional location measurements of the first AP and the second AP based on the trigger.

FIG. 1 illustrates an example of a network environment 100 for estimating a location of an object in accordance with some aspects of the disclosure. The network environment includes a plurality of APs 105 that are communicating with various devices within a corresponding transmission region 110 that corresponds to the geographic area the AP 105 can communicate within based on transmission power. Each AP 105 partially overlaps another AP 105 to ensure suitable geographic coverage of a region. An example of a region includes a building, a campus, or another configuration of indoor and/or outdoor space relating to an entity. For example, the network environment 100 can be a temporary network environment for a business meeting, a sports complex, and so forth.

Each AP 105 is connected to a network interface 115 via a backhaul interface (e.g., an Ethernet network) to connect to another network (e.g., a core network associated with a wireless carrier, a core network associated with a network provider, etc.) and each AP 105 can coordinate resources with other APs. For example, each AP 105 can automatically configure a channel based on neighboring AP to prevent interference in overlapping broadcast areas.

In one illustrative aspect, user equipment (UE) 120 can be positioned to receive signals from a plurality of APs 105, which allow the UE 120 to benefit from location estimation services. For purposes of illustration, the UE 120 requests location estimation of itself, but the UE 120 can request location estimates of other objects, such as a UE, a tag capable of being tracked within the network environment 100, and so forth.

As illustrated in FIG. 1, a plurality of APs 105 can overlap and enable each AP 105 to listen to other APs. In some cases, each APs 105 can transmit a beacon (e.g., an 802.11k beacon) to identify other objects within the AP's respective transmission region 110. This allows the AP 105 to be informed of other devices and the transmission characteristics of the other devices to allow the AP 105 to configure its transmission parameters, such as a channel (e.g., an assigned block of frequencies for communication), transmission power, scheduling, and other information. When an AP 105 transmits a broadcast message to perform a location estimation function, the other APs within the transmission range can receive the signal. In some aspects further described below, the other APs, which are coordinating APs, can be configured to receive reference signals from an originating AP and the UE, and can report these measurements to the originating AP. The originating AP can determine the RTT with the UE from the coordinating APs to estimate the location of the UE 120.

In some aspects, each of the APs 105 is configured to automatically and iteratively determine position based on a plurality of location determinations. The location can be determined based on absolute location (e.g., a global navigation satellite system (GNSS)) and relative location of the AP based on other APs. In some cases, APs not necessarily include a GNSS module for receiving satellite signals to identify an absolute geolocation and the GNSS and may only support relative location. Even if the APs do include a GNSS module, there is no guarantee that the AP will be installed at a location that ensures accurate reference signals.

Figure 2:
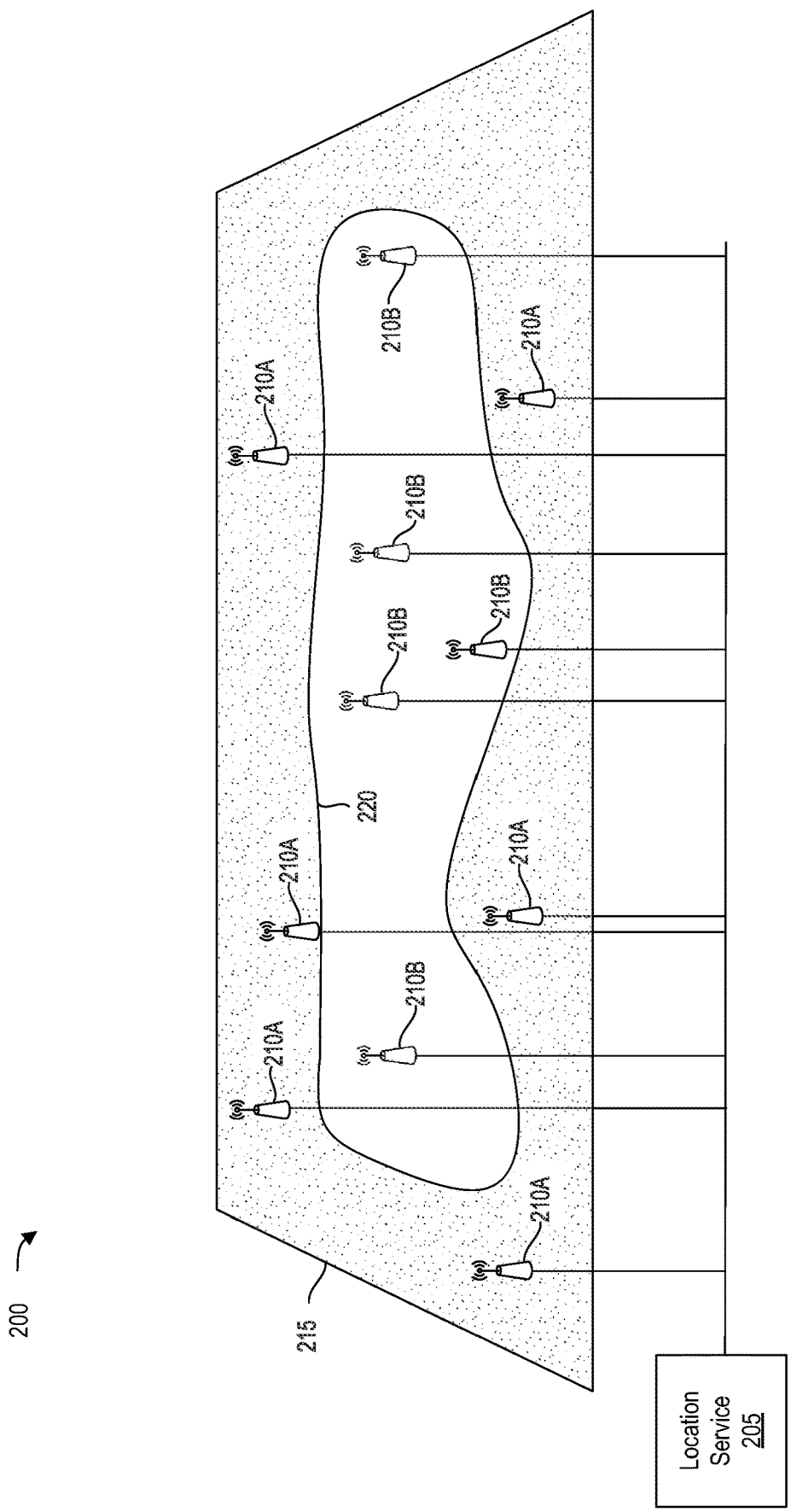
FIG. 2 illustrates an example network environment including location service that is configured to determine a location of a plurality of network entities in accordance with some aspects of the disclosure.

FIG. 2 illustrates an example network environment 200 including location service 205 that is configured to determine a location of a plurality of APs 210A that can receive a reference signal for determining an absolute location (e.g., a geolocation) and a plurality of APs 210B that can determine a relative position. In this aspect, each of the plurality of APs 210A and plurality of APs 210B may be connected to the location service 205 through a wired network connection. In one aspect, the plurality of APs 210A are proximate to a building boundary (e.g., near a window) and can receives a satellite-based reference signal such as GNSS. The network environment 200 includes a plurality of APs 201B that are unable to receive or decode at least one reference signals from various sources, such as the satellite-based reference signal. In other cases, the reference signal may be a wireless communication system (e.g., a next generation node B (gNB)) that is aware of its physical location and may provide information absolute location to any one of the plurality of APs 210A.

In some aspects, the plurality of APs 210A is located between a building boundary (e.g., an internal location within the building, or an external location within the building) and an inner boundary 220 in which the reference signals cannot be received and/or decoded. For example, within the inner boundary 220, the received signal strength indicator (RSSI) of the reference signal may not have sufficient power to be properly decoded within the corresponding AP 210B and cannot be used as a reference signal.

In some aspects, the location service 205 is configured to receive the various measurements described herein, such as location information, timing information, phase information, and so forth, to determine a location of a corresponding AP. In particular, the location service 205 is configured to determine weights associated with each different measurement technique and perform a computation to determine the position of each AP.

Figure 3:
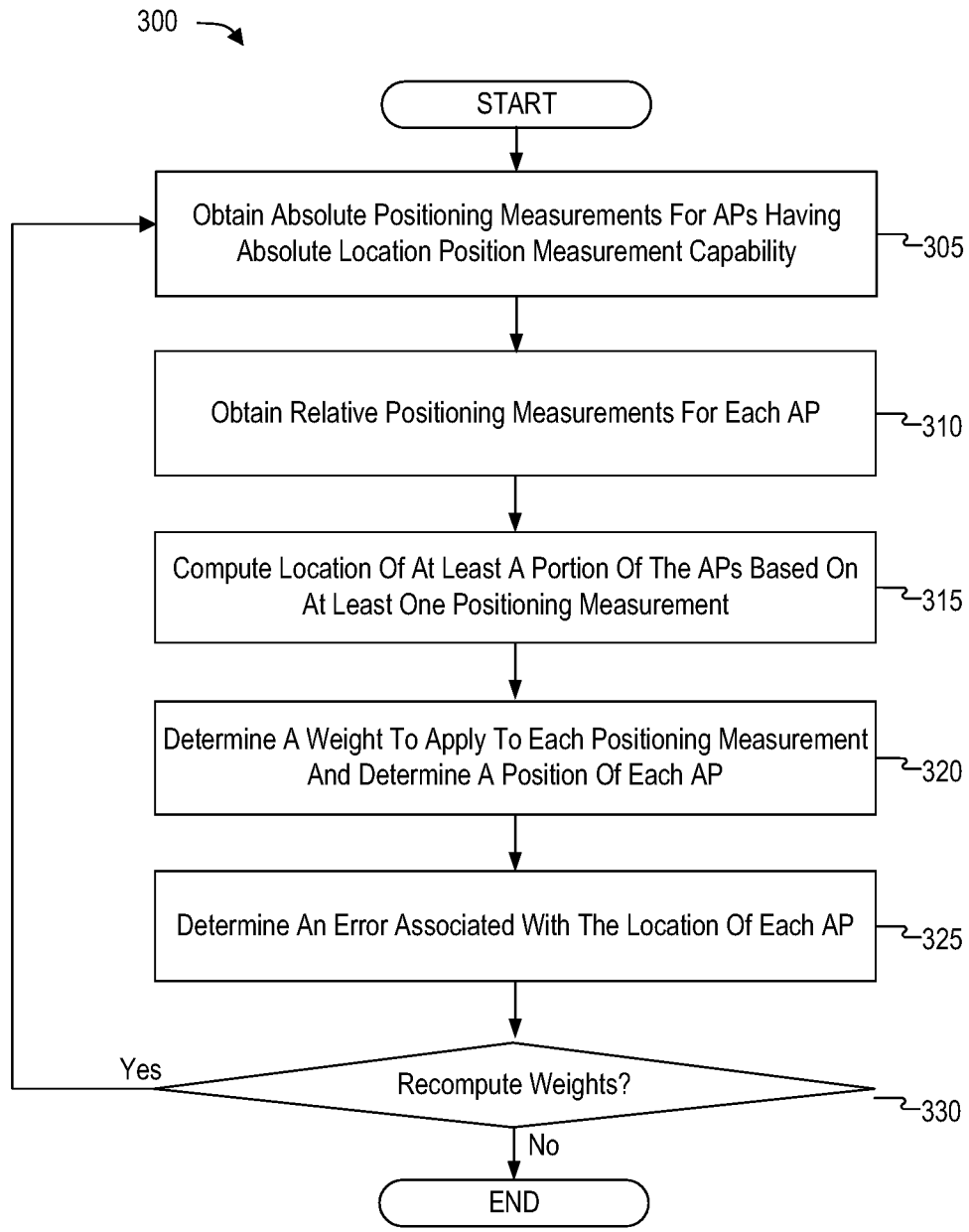
FIG. 3 illustrates an example method that can be performed by a network service for autonomously estimating network entity position based on coordinating network entities in accordance with some aspects of the disclosure.

FIG. 3 illustrates an example method 300 that can be performed by a network service (e.g., a network server executing the location service 205) for autonomously estimating AP position based on coordinating APs in accordance with some aspects of the disclosure. Although the example method 600 depicts a particular sequence of operations, the sequence can be altered without departing from the scope of the present disclosure. For example, some of the operations depicted can be performed in parallel or in a different sequence that does not materially affect the function of the method 600. In other examples, different components of an example device or system that implements the method 600 can perform functions at substantially the same time or in a specific sequence. In one illustrative aspect, the method 600 can be executed by the computing system 800 or another network entity, such as an AP or other device, to autonomously estimate device location based on coordinating APs.

At block 305, the method 300 can obtain (e.g., by the computing system 800) absolute positioning measurements for APs having absolute location position measurement capability. For example, the plurality of AP's 210 in FIG. 2 includes at least one type of absolute location position measurement, such as a 5G connection or a WiFi connection. At block 310, the method 300 can obtain (e.g., by the computing system 800) obtain relative positioning measurements for each AP. For example, the relative positioning measurement may correspond to a signal that can be measured using ToF (e.g., time of arrival (ToA), TDoA, etc.). Based on multiple measurements, the physical location of the corresponding neighbor device may be ascertained using a plurality of measurements.

At block 315, the method 300 can compute (e.g., by the computing system 800) a location of at least a portion of the APs based on at least one relative positioning measurement. According to some aspects, the relative positioning measurement identifies a position relative to other devices or network entities, such as an AP. In some cases, the relative positioning measurement at block 315 can include multiple measurements using different measurement techniques, such as RTT, signal strength (e.g., RSSI), carrier phase, and so forth. An illustrative example of computing location is described herein with reference to FIG. 4. After determining the location of the APs, at block 320, the method 300 includes determining (e.g., by the computing system 800) a weight to apply to each positioning measurement (e.g., absolute positioning measurement and relative positioning measurement) and determining a position of each AP. In some cases, the weight may be based on feedback information such as a weight that is derived from a previous iteration of the method 300.

At block 325, the method 300 includes determining (e.g., by the computing system 800) an error associated with the location of the AP determined at block 320. After determining an error associated with the location determination at block 325, and at block 330, the method 300 includes determining (e.g., by the computing system 800) whether to recompute the weights based on the error and the location of each AP. If it is determined to recompute the weights, the method 300 returns to another corresponding previous block 310 (e.g., block to perform another measurement using the weights calculated at block 320. In one illustrative aspect, the method 300 can delay the subsequent iteration in some cases. For example, the method 300 can include identifying adverse channel conditions based on the number of busy channels, the number of idle channels, and so forth. In some cases, the method 300 may elect to perform a subsequent iteration when less network traffic may interfere with the method 300.

Figure 4:
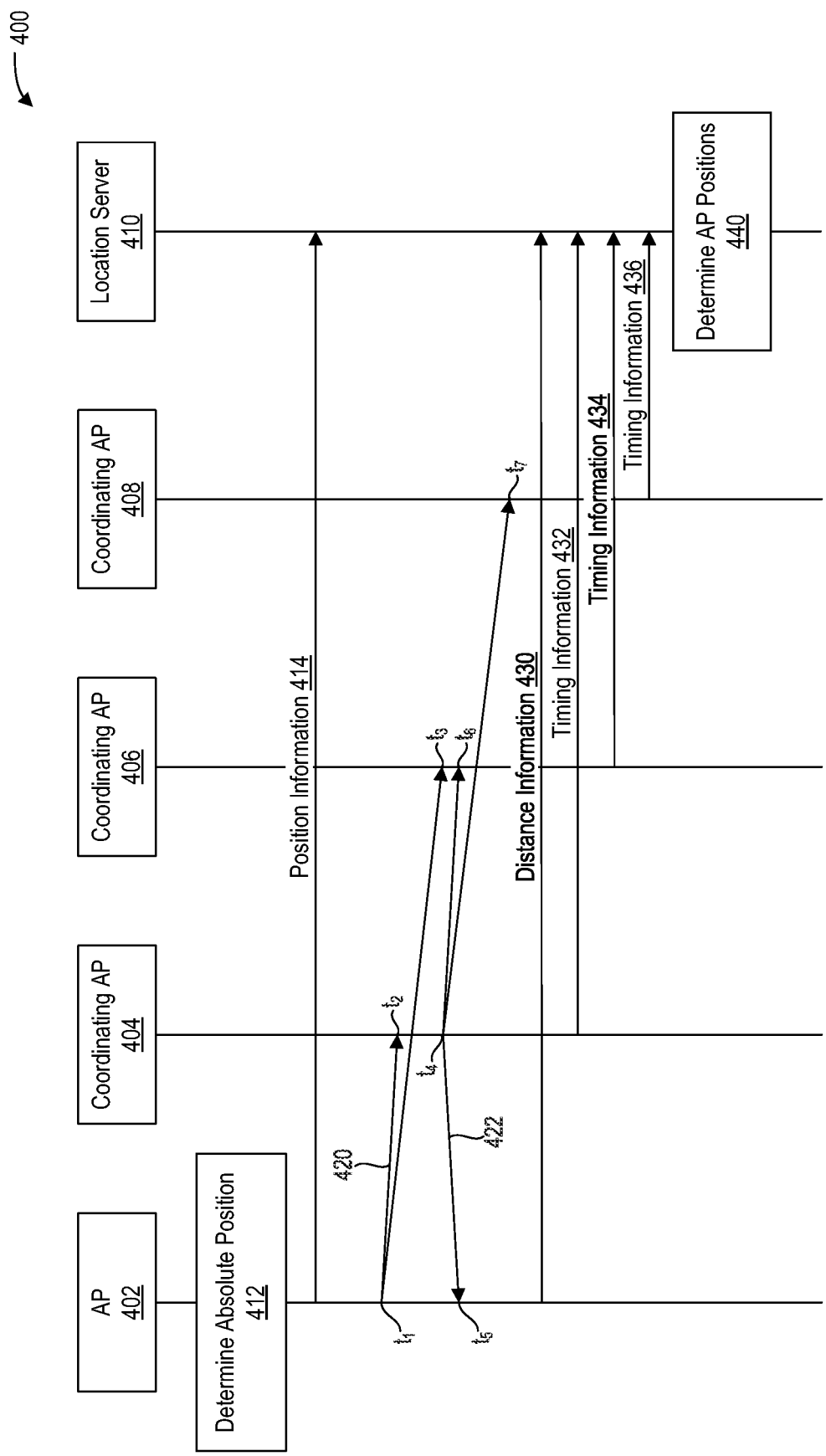
FIG. 4 illustrates a sequence diagram of a method for estimating a location of a network entity in accordance with various aspects of the disclosure.

FIG. 4 illustrates a sequence diagram 400 of a method for estimating a location of a network entity such as an AP in accordance with various aspects of the disclosure. In one illustrative aspect, the AP 402 may be initiated by another device such as the location service 205 to determine the position of the AP 402. In some cases, the AP 402 supports absolute positioning based on at least one technique. Non-limiting examples of absolute positioning technique include measuring satellite signals from a GNSS constellation, or performing positioning detection using a wireless communication system such as 5G. At block 412, the AP may determine its absolute position using at least one of the techniques described above and then provide position information 414 to a location server.

In another aspect, the AP 402 may be configured to determine a relative position of the AP 402 or an adjacent AP such as coordinating AP 404 and coordinating AP 406. In this aspect, the coordinating AP 408 is outside a communication range of the AP 402 and cannot be used to identify a relative position of the AP 402. In one aspect, the AP 401 provides a reference signal 420 at time $t_1$ to the coordinating AP 404, which receives the reference signal 420 at time $t_2$. According to some aspects, the reference signal 420 is broadcasted, and the coordinating AP 406 may be within communication range and can be put into a detection mode to converge position location information. In this case, because the coordinating AP 406 is within communication range, the coordinating AP 406 receives the reference signal 420 at time $t_3$. In some cases, the various APs (e.g., the AP 402, the coordinating AP 404, the coordinating AP 406, and the coordinating Ap 408) can be placed in a mode to enable detection of broadcasted messages to report the time the messages are received.

The reference signal 420 may be used to determine a ToA which is one measurement that can be used to identify distances between the AP 402 and the coordinating AP 404. In another aspect, the coordinating AP 404 may be configured to transmit a reference signal reply 422 (e.g., a reference signal reply message) to the AP 402 at time $t_4$, which is received by the AP 402 at time $t_5$. In this aspect, the coordinating AP 406 may be within communication range of the coordinating AP 404 and receives the reference signal reply 422 at time $t_6$, and the coordinating AP 408 may also be within a communication range of the coordinating AP 404 and receives the reference signal reply 422 at time $t_7$.

In some aspects, the various network entities (e.g., the AP 402, the coordinating AP 404, the coordinating AP 406, and the coordinating AP 408) may provide various information in various configurations to the AP 402 or a location server 410. For example, in the case that the reference signal 420 includes a timestamp in units of nanoseconds and the coordinating AP 404 is synchronized in time with the AP 402, the coordinating AP 404 may provide ToA information to the location server 410. In other aspects, the reference signal reply 422 may include a delay indicating a difference between time t2 and t4 to allow the AP 402 to identify the TDoA, which can be used to determine the RTT.

In some aspects, the AP 402 may be configured to provide distance information 430 that identifies a distance between the AP 402 and the coordinating AP 404. In another aspect, the coordinating AP 406 may be configured to provide timing information that identifies information related to the time at which the coordinating AP 404 receives the reference signal 420. The coordinating AP 406 may be configured to provide timing information 434 to the location server 410, and the coordinating AP 408 may also be configured to provide timing information 436 to the location server 410. In some cases, at least one of the coordinating AP 404, the coordinating AP 406, and the coordinating AP 408.

Although FIG. 4 describes various techniques including TDoA, ToA, and RTT to determine relative distances, carrier phase measurements can also be configured to determine relative distances. In one aspect, a carrier phase measurement comprises determining a difference between carrier wave cycles between a source device (e.g., the AP 402) and a target device (e.g., the coordinating AP 404). For example, at high frequencies with large bandwidths (e.g., 5 GHz spectrum), the carrier wave cycles can be measured by performing a frequency sweep and determining when the higher frequency carrier is greater than one wavelength different than the lower frequency carrier. In one illustrative aspect, the carrier phase measurements can be performed in ultrawide bandwidth (UWB). In other aspects, the various measurements illustrated in FIG. 4 may also be done in various line-of-sight (LOS) frequency bands and non-line-of-sight (NLOS) frequency bands.

After determining the various timing and distance information and providing the information to the location server 410, the location server 410 is configured to determine at least one AP position at block 440. As further described below in FIG. 4, block 440 can also include determining weights of different measurement techniques and identifying whether the determined position is sufficiently accurate, then iteratively performing measurements shown in FIG. 5.

Figure 5:
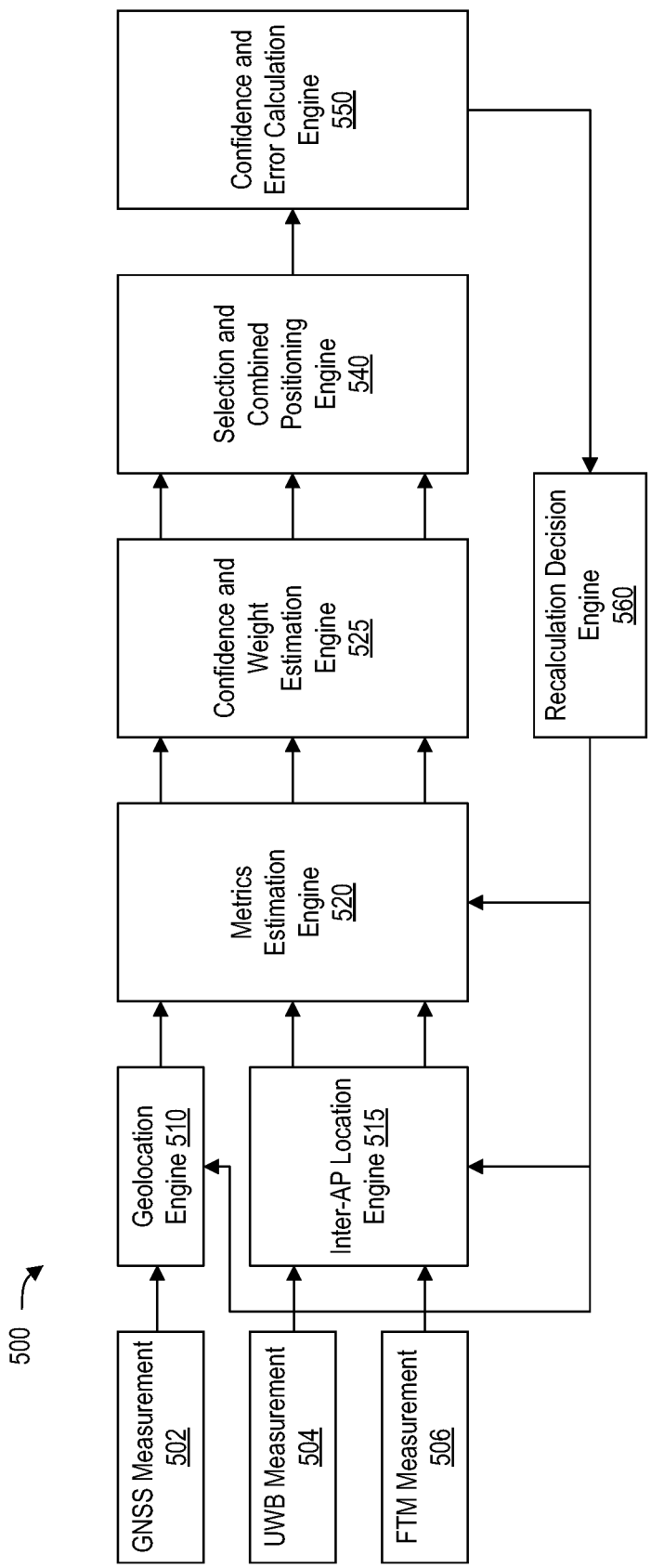
FIG. 5 illustrates a conceptual diagram of a weight estimator for determining network entity position based on various measurements in accordance with some aspects of the disclosure.

FIG. 5 illustrates a conceptual diagram of a weight estimator 500 in accordance with some aspects of the disclosure. In some aspects, the weight estimator 500 may be used by a device (e.g., the location server 410, the location service 205) to iteratively determine locations of a plurality of network entities, such as the APs 210A and the APs 210B.

In one aspect, the weight estimator 500 receives a plurality of measurements including at least one of a GNSS measurement 502, a UWB measurement 504, and an FTM measurement 506. Each of the GNSS measurement 502, the UWB measurement 504, and the FTM measurement 506 include information related to distance. In the case of timing information, the distance can be computed based on the ToF (e.g., half the RTT). In some cases, the UWB measurement 504 and/or the FTM measurement 506 may also include phase information for determining a distance based on the number of carrier wave cycles from a transmitting device to a receiving device.

The GNSS measurement 502 is provided to a geolocation engine 510 that is configured to determine an absolute position based on geolocation. In some aspects, the GNSS measurement 502 may be provided from a terrestrial source such as a base station that is configured to measure absolute location. As noted above, the GNSS measurement 502 may only be provided by some of the various APs based on each APs capabilities.

The UWB measurement 504 and the FTM measurement 506 are provided to an inter-AP location engine 515 that is configured to determine a relative position with respect to other measurements from other APs. In one illustrative example, the inter-AP location engine 515 may generate a multidimensional array of times, distances, and other information from the UWB measurement 504 and/or the FTM measurement 506 and provide the multidimensional array to a module to identify the locations of each AP. In some aspects, a machine learning (ML) model of the inter-AP location engine 515 may be trained to classify and then select locations of each AP. In some aspects, the inter-AP location engine 515 is configured to identify locations per measurement technique. For example, if 5 APs support UWB measurements and 10 APs support FTM, the inter-AP location engine 515 may provide a first output based on the measurements of the UWB-capable devices and a second output based on the measurements of the FTM-capable devices.

In some aspects, the geolocation engine 510 is configured to provide geolocation information to a metrics estimation engine 520 and the inter-AP location engine 515 is configured to provide locations and distances of the various APs to the metrics estimation engine 520. The metrics estimation engine 520 is configured to use various metrics based on the measurement technique to determine a suitable weight to apply to each measurement technique. In some cases, the metrics estimation engine 520 may also receive feedback in the form of previous weights from a previous iteration and use previous weights as a starting point.

In the case of GNSS measurements, the metrics estimation engine 520 may use various properties such as carrier to noise power in a 1 Hz bandwidth (C/N0), horizontal dilution of precision (HDOP), residual phase error and number of satellites.

In the case of FTM measurements, bandwidth and bandwidth utilization (e.g., channel occupancy) directly affect the resolution of the FTM measurement and can be used to determine metrics associated with the measurement. Channels in current standards select a channel dynamically based on availability of channel and interference and the accuracy of FTM varies based on selected bandwidth. In some cases, multipath can also degrade performance based on the late arrival of packets that experienced fading due to multipath. The metrics estimation engine 520 may also use inter-protocol validation, which is described below with respect to the recalculation decision engine 560, to determine LOS or NLOS.

In the case of UWB measurements, the metrics may be determined based on LOS and NLOS, which can be determined based on a channel impulse response (CIR). In some aspects, the LOS and NLOS metric is the ratio of the power of the first tap of an equalizer filter to the power of the rest of the delayed taps of the equalizer filter. The metrics estimation engine 520 may also use inter-protocol validation, which is described below with respect to the recalculation decision engine 560, to determine LOS or NLOS.

The metrics determined by the metrics estimation engine 520, as well as identified locations by the geolocation engine 510 and the inter-AP location engine 515, are provided to a confidence and weight estimation engine 525. In some aspects, the confidence and weight estimation engine 525 is configured to calculate a weight per network entity (e.g., per AP) and per measurement technique (e.g., GNSS, FTM, UWB, etc.). The weight of a GNSS measurement is provided by equation 1 below:

$$W_{GNSS} = \begin{cases} 0 : \text{No signal} \\ 1 : HDOP < \text{Threshold} - w_1 * CN0 + w_2 * HDOP \end{cases} \quad (1)$$

where T is a threshold that is updated based on the last uncertainty value, $w_1$ is the weight of the CN0 measurement, and $w_2$ is the weight of the HDOP measurement. In some cases, T and the weights are adaptively tuned by the confidence and weight estimation engine 525 across different iterations. In some aspects, the weights of the UWM or FTM may be calculated based on the CIR and the power ratio of the LOS and the NLOS as described in equation 2 below:

$$W_{UWB|FTM} = \begin{cases} 0 : \text{No signal} \\ 1 : P_{CIR} - \dfrac{P_{LOS}}{P_{LOS} + P_{NLOS}} \end{cases} \quad (2)$$

where $P_{CIR}$ is the power of the channel impulse response, $P_{LOS}$ is the power of the LOS, and $P_{NLOS}$ is the power of the NLOS. In some aspects, the weight of FTM can be calculated based on the bandwidth with higher bandwidth will have a larger weight.

The weights, locations, and other relevant information are provided to a selection and combined positioning engine 540 that uses the weights to determine a final position. In one aspect, the selection and combined positioning engine 540 applies equation 3 below to determine the final position:

$$P_{FINAL} = W_{GNSS} \times P_{GNSS} + W_{UWB} * P_{UWB} + W_{FTM} \times P_{FTM} \quad (3)$$

where $P_{FINAL}$ is the final position, $P_{GNSS}$ is the position determined using GNSS, $P_{UWB}$ is the positing determined using UWB, and $P_{FTM}$ is the position determined using FTM.

The final position is provided from the selection and combined positioning engine 540 to a confidence and error calculation engine 550 to determine a confidence or an uncertainty of the final position. In some aspects, the confidence and error calculation engine 550 use various techniques to identify faulty estimations. The confidence and error calculation engine 550 can be a rule-based engine that uses statistics and identifies final positions that have error. For example, the standard deviation of multiple measurements can provide a confidence (or uncertainty) in a final position.

The weights and confidences and other pertinent information are provided to a recalculation decision engine 560 that determines whether to recalculate a position of one or more network entities. For example, the recalculation decision engine 560 may use a maximum standard deviation to identify a position of a network entity that does not have sufficient confidence. In one illustrative aspect, the recalculation decision engine 560 may use an inter-protocol validation to determine a confidence. In this case, the relative distance between some network entities may include GNSS receiver to determine LOS and NLOS channel, or light NLOS channels between different network entities. In one aspect, a distance based on geolocation between two different network entities can be identified using equation 4 below:

$$D_{GNSS} = \sqrt{(AP1_X - AP2_X)^2 + (AP1_Y - AP2_Y)^2} \quad (4)$$

where $D_{GNSS}$ is the distance between AP1 and AP2, $AP1_X$ is the location of AP1 on X axis, $AP1_Y$ is the location of the AP1 on the Y axis, $AP2_X$ is the location of AP2 on X axis, $AP2_Y$ is the location of the AP2 on the Y axis. In this case, if distance from the FTM or UWB is less than $D_{GNSS}-HDOP_{AP1}-HDOP_{AP2}$, or larger than $D_{GNSS}+HDOP_{AP1}+HDOP_{AP2}$, the distances deviate greater than the HDOP radius and the measurement of the network entity should be performed again.

In some aspects, the recalculation decision engine 560 may trigger another iteration of the measurements to refine the weights based on the measurements. In some cases, the recalculation decision engine 560 may also defer the measurements based on various factors such as channel occupancy, time of day, and so forth. The FTM and UWB measurements may consume a significant amount of bandwidth over a short period, and high channel occupancy and reduce the accuracy of FTM measurements. In that case, the recalculation decision engine 560 may perform initial iterations of the measurements, and then defer more intensive measurements for a time that has less channel occupancy, less objects within the environment that may cause adverse radio effects (e.g., reflections due to objects moving in the environment, etc.), and so forth.

Figure 6:
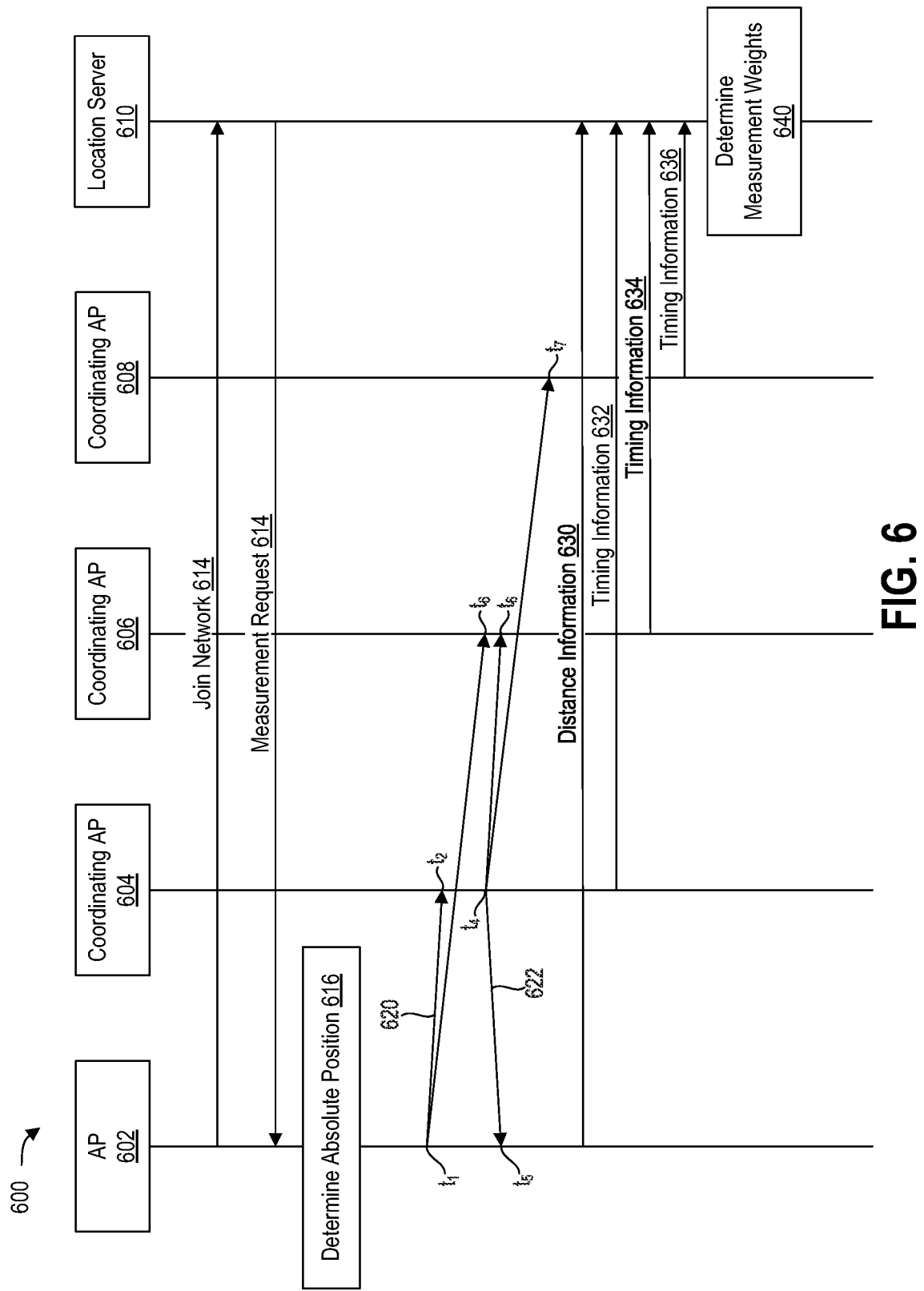
FIG. 6 illustrates a sequence diagram of a method for triggering an iteration of a method for estimating a location of a network entity in accordance with various aspects of the disclosure.

FIG. 6 illustrates a sequence diagram of a method 600 for triggering an iteration of a method for estimating a location of a network entity in accordance with various aspects of the disclosure. According to some aspects of the disclosure, various network entities may be configured to autonomously receive a location based on a triggering event. An example trigger can include joining the network, which causes an AP 602 to autonomously receive a location. For example, the AP 602 sends messages including a join network message 612, for example a request for an address to dynamic host configuration protocol (DHCP) service, which causes a location server 610 to receive the join network message 612. The location server 610 responds with a measurement request 614 that requests the AP 602 to provide multiple measurement requests based on the capabilities of the AP 602. In this case, the AP 602 measures its absolute position 616 based on the various techniques described above. The AP 602 may also transmit a reference signal 620 (e.g., an FTM measurement signal) to a coordinating AP 604, which is also received by another coordinating AP 606. The coordinating AP 604 responds to the reference signal with a reference signal reply 622 (e.g., an FTM measurement reply). The reference signal reply 622 may be received by the coordinating AP 606 and a coordinating AP 608 that is outside a communication range of the AP 602. As described above, the AP 602 can provide various measurements to the location server 610 such as distance information 630, but could also include information for determining distance (e.g., timing information). The coordinating AP 606 and the coordinating AP 608 may also provide information for determining distance such as timing information 632, 634, and 636.

At block 640, the location server 610 is configured to use current stored weights associated with the current APs relative to the measurement to determine a position of the Ap 602. For example, the location server 610 may compute the location of the AP 602 based on the absolute measurements (e.g., GNSS), the FTM measurements, and the UWB measurements based on initial weights. In some cases, the location server 610 may also generate cross-referencing information such as distances between the coordinating APs 604, 606, and 608 based on weights associated with measurement techniques of that the coordinating APs 604, 606, and 608 were determined by a previous iteration of the measurement techniques. In some cases, at block 640, the location server may determine that the weights of the coordinating APs 604, 606, and 608 are invalidated due to the presence of the new AP 602 may further trigger subsequent iterations of the techniques described in various aspects of the disclosure.

Figure 7:
FIG. 7 illustrates an example method that can be performed by a network service for autonomously estimating network entity position based on coordinating network entities in accordance with some aspects of the disclosure.

FIG. 7 illustrates an example method that can be performed by a network service for autonomously estimating network entity position based on coordinating network entities in accordance with some aspects of the disclosure. Although the example method 700 depicts a particular sequence of operations, the sequence can be altered without departing from the scope of the present disclosure. For example, some of the operations depicted can be performed in parallel or in a different sequence that does not materially affect the function of the method 700. In other examples, different components of an example device or system that implements the method 700 can perform functions at substantially the same time or in a specific sequence.

According to some examples, the method 700 includes receiving (e.g., by the computing system 800) a first location measurement associated with a first measurement variant and a second location measurement associated with a second measurement variant from a first AP at block 705. In one illustrative aspect, the first location measurement and the second location measurement are distinct and selected from at least one of an FTM, and UWB measurement, and an absolute positioning measurement. For example, the absolute positioning measurement comprises a satellite geolocation measurement or a communication network measurement using network entities with known geolocations.

In one aspect, the method 700 receives (e.g., by the computing system 800) a third location measurement associated with the first measurement variant and a fourth location measurement associated with the second measurement variant from a second AP at block 710. The third location measurement and the fourth location measurement are distinct and selected from at least one of an FTM, and UWB measurement, and an absolute positioning measurement.

At block 715, the method comprises determining a first weight associated with the first location measurement, a second weight associated with the second location measurement, a third weight associated with the third location measurement, and a fourth weight associated with the fourth location measurement.

In one illustrative aspect, the determining of the weights at block 715 comprises determining (e.g., by the computing system 800) a line-of-sight quality associated with the first location measurement based on a channel impulse response (CIR) of the first location measurement.

After determining the weights, at block 720, the method includes determining (e.g., by the computing system 800) a first location associated with the first AP and a second location associated with the second AP based on the first weight, the second weight, the third weight, and the fourth weight.

After the locations are determined, at block 725, the method includes determining (e.g., by the computing system 800) a confidence of the first location based on a comparison of the first location measurement and the second location measurement at block 725. In one illustrative aspect, the confidence is determined based on a satellite location measurement of the first AP and the second AP. For example, block 725 may include determining a distance between the first AP and the second AP based on a satellite location measurement of the first AP and the second AP, and then determining a horizontal dilution of the satellite location measurement of the first AP and the second AP. In one example, the method may determine whether one of the first location measurement, the second location measurement, the third location measurement, or the fourth location measurement are outside a range associated with the distance and the horizontal dilution. Measurements outside of the range associated with the distance and the horizontal dilution have low confidence or are thrown out, for example.

In some aspects, the method includes identifying a trigger to perform to additional location measurements of the first AP and the second location at block 730. Non-limiting examples of triggers include at least one of a channel occupancy threshold and a time determined based on channel occupancy over a recorded of a unit of time. For example, if a channel occupancy is less than a 25% over a 15 period, the method can trigger an additional location measurement.

In another example, the trigger can be receiving a message indicating a third AP has joined in a network including the first AP and the second AP. In this example, the method comprises providing instructions to the third AP to measure a plurality of location measurements based on at least one of the first AP and the second AP, and determining a third location associated with the third AP based on the plurality of location measurements.

According to some aspects, the method includes performing the additional location measurements of the first AP and the second location based on the trigger at block 735. For example, the computing system 800 may run iterative tests at different periods of low channel occupancy across different days to validate the measurements, or identify any changes that may have occurred. As an example, a server rack including an AP may physically move, and the method periodically checks to ensure that the measurements are autonomously updated based on the various triggers described herein.

Figure 8:
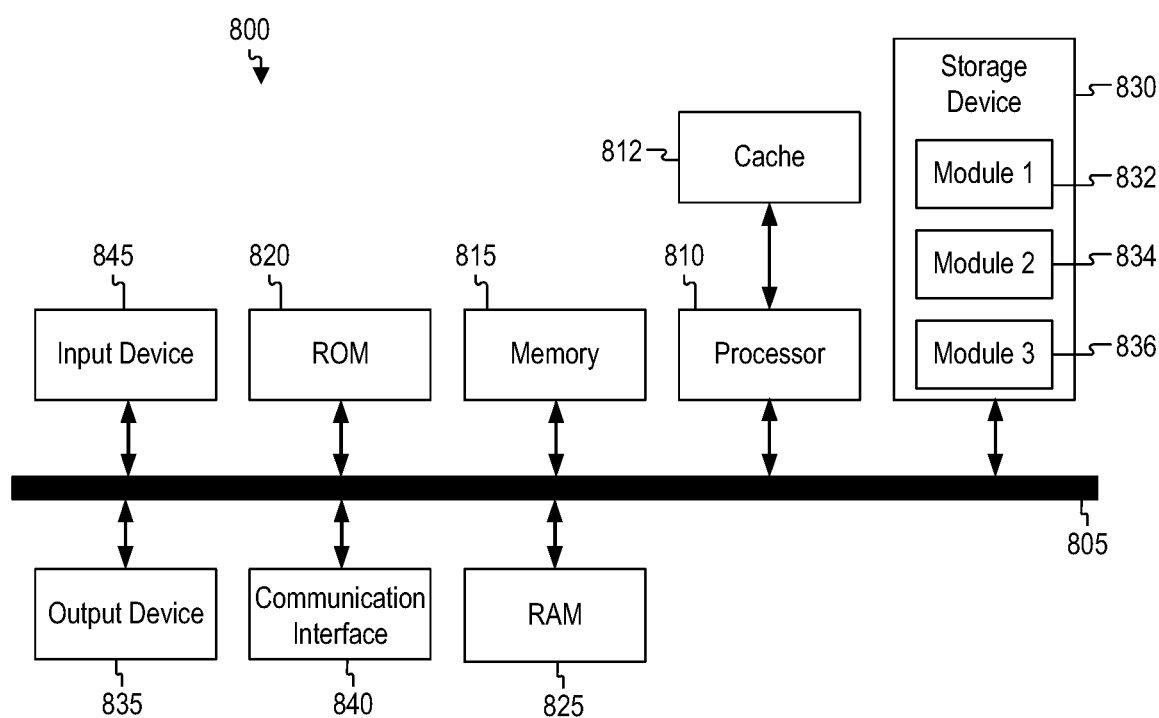
FIG. 8 shows an example of a computing system, which can be for example any computing device that can implement components of the system.

FIG. 8 shows an example of computing system 800, which can be for example any computing device making up the various roles described above or any component thereof in which the components of the system are in communication with each other using connection 805. Connection 805 can be a physical connection via a bus, or a direct connection to processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 can essentially be a completely self-contained computing system, containing multiple cores or processors, a bus, memory controller, cache, etc. A multi-core processor can be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here can easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology can be presented as including individual functional blocks including functional blocks comprising devices, device components, steps or routines in a method embodied in software, or combinations of hardware and software.

Any of the steps, operations, functions, or processes described herein can be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Figure 9:
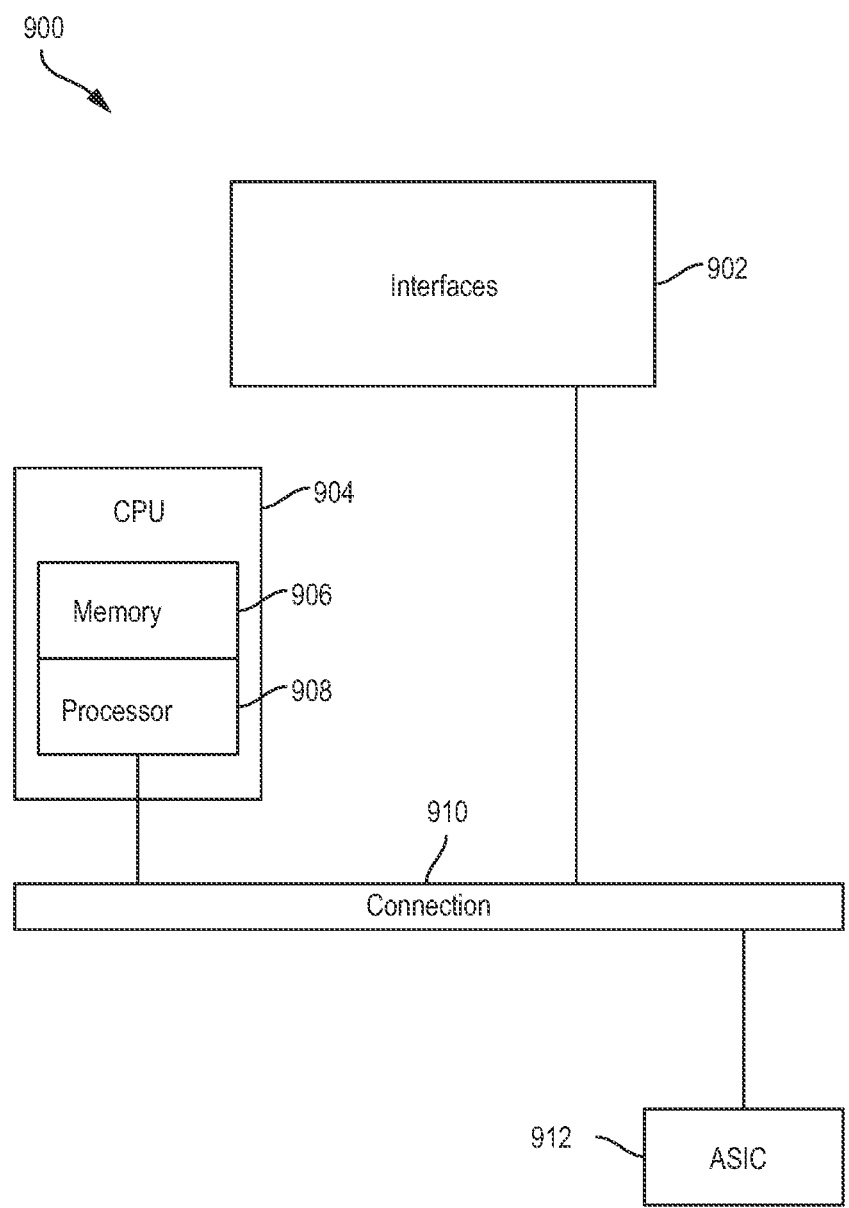
FIG. 9 illustrates an example network device in accordance with some examples of the disclosure.

FIG. 9 illustrates an example network device 900 suitable for performing switching, routing, load balancing, and other networking operations. The example network device 900 can be implemented as switches, routers, nodes, metadata servers, load balancers, client devices, and so forth.

Network device 900 includes a central processing unit (CPU) 904, interfaces 902, and a bus 910 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 can include one or more processors 908, such as a processor from the INTEL X86 family of microprocessors. In some cases, processor 908 can be specially designed hardware for controlling the operations of network device 900. In some cases, a memory 906 (e.g., non-volatile RAM, ROM, etc.) also forms part of CPU 904. However, there are many different ways in which memory could be coupled to the system.

The interfaces 902 are typically provided as modular interface cards (sometimes referred to as "line cards"). Generally, they control the sending and receiving of data packets over the network and sometimes support other peripherals used with the network device 900. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, asynchronous transfer mode (ATM) interfaces, HSSI interfaces, POS interfaces, FDDI interfaces, WIFI interfaces, 3G/4G/5G cellular interfaces, CAN BUS, LoRA, and the like. Generally, these interfaces can include ports appropriate for communication with the appropriate media. In some cases, they can also include an independent processor and, in some instances, volatile RAM. The independent processors can control such communications intensive tasks as packet switching, media control, signal processing, crypto processing, and management. By providing separate processors for the communication intensive tasks, these interfaces allow the master CPU (e.g., 904) to efficiently perform routing computations, network diagnostics, security functions, etc.

Although the system shown in FIG. 9 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 900.

Regardless of the network device's configuration, it can employ one or more memories or memory modules (including memory 906) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc. Memory 906 could also hold various software containers and virtualized execution environments and data.

The network device 900 can also include an application-specific integrated circuit (ASIC) 912, which can be configured to perform routing and/or switching operations. The ASIC 912 can communicate with other components in the network device 900 via the bus 910, to exchange data and signals and coordinate various types of operations by the network device 900, such as routing, switching, and/or data storage operations, for example.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

For clarity of explanation, in some instances, the present technology can be presented as including individual functional blocks including functional blocks comprising devices, device components, steps or routines in a method embodied in software, or combinations of hardware and software.

Any of the steps, operations, functions, or processes described herein can be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, solid state memory devices, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A method of determining a location of an access point (AP), comprising: receiving a first location measurement associated with a first measurement variant and a second location measurement associated with a second measurement variant from a first AP; receiving a third location measurement associated with the first measurement variant and a fourth location measurement associated with the second measurement variant from a second AP; determining a first weight associated with the first location measurement, a second weight associated with the second location measurement, a third weight associated with the third location measurement, and a fourth weight associated with the fourth location measurement; determining a first location associated with the first AP and a second location associated with the second AP based on the first weight, the second weight, the third weight, and the fourth weight; determining a confidence of the first location based on a comparison of the first location measurement and the second location measurement; identifying a trigger to perform additional location measurements of the first AP and the second AP; and performing the additional location measurements of the first AP and the second AP based on the trigger.

Aspect 2. The method of Aspect 1, wherein the first location measurement and the second location measurement are distinct and selected from at least one of a fine tune measurement (FTM), and ultrawideband (UWB) measurement, and an absolute positioning measurement.

Aspect 3. The method of any of Aspects 1 to 2, wherein the third location measurement and the fourth location measurement are distinct and selected from at least one of a FTM, and UWB measurement, and an absolute positioning measurement.

Aspect 4. The method of any of Aspects 1 to 3, wherein the absolute positioning measurement comprises a satellite geolocation measurement or a communication network measurement using network entities with known geolocations.

Aspect 5. The method of any of Aspects 1 to 4, wherein determining the first weight associated with the first location measurement comprises: determining a line-of-sight quality associated with the first location measurement based on a channel impulse response (CIR) of the first location measurement.

Aspect 6. The method of any of Aspects 1 to 5, wherein the trigger comprises at least one of a channel occupancy threshold and a time determined based on channel occupancy over a recorded unit of time.

Aspect 7. The method of any of Aspects 1 to 6, wherein determining the confidence of the first location based on a comparison of the first location measurement and the second location measurement comprises: determining a distance between the first AP and the second AP based on a satellite location measurement of the first AP and the second AP; determining a horizontal dilution of the satellite location measurement of the first AP and the second AP; and determining whether one of the first location measurement, the second location measurement, the third location measurement, or the fourth location measurement are outside a range associated with the distance and the horizontal dilution.

Aspect 8. The method of any of Aspects 1 to 7, further comprising: receiving a message indicating a third AP has joined in a network including the first AP and the second AP; providing instructions to the third AP to measure a plurality of location measurements based on at least one of the first AP and the second AP; and determining a third location associated with the third AP based on the plurality of location measurements, the first location associated with the first AP, and the second location associated with the second AP.

Aspect 9. The method of any of Aspects 1 to 8, further comprising: based on the plurality of location measurements of the third AP, determining a second confidence of the first weight, the second weight, the third weight, and the fourth weight; and determining whether to perform the additional location measurements based on the second confidence of the first weight, the second weight, the third weight, and the fourth weight.

Aspect 10. A network device includes a transceiver (e.g., a network interface, a wireless transceiver, etc.) and a processor coupled to the transceiver. The processor configured to execute instructions and cause the processor to: receive a first location measurement associated with a first measurement variant and a second location measurement associated with a second measurement variant from a first AP; receive a third location measurement associated with the first measurement variant and a fourth location measurement associated with the second measurement variant from a second AP; determine a first weight associated with the first location measurement, a second weight associated with the second location measurement, a third weight associated with the third location measurement, and a fourth weight associated with the fourth location measurement; determine a first location associated with the first AP and a second location associated with the second AP based on the first weight, the second weight, the third weight, and the fourth weight; determine a confidence of the first location based on a comparison of the first location measurement and the second location measurement; identify a trigger to perform additional location measurements of the first AP and the second AP; and perform the additional location measurements of the first AP and the second AP based on the trigger.

Aspect 11. The network device of Aspect 10, wherein the first location measurement and the second location measurement are distinct and selected from at least one of a fine tune measurement (FTM), and ultrawideband (UWB) measurement, and an absolute positioning measurement.

Aspect 12. The network device of any of Aspects 10 to 11, wherein the third location measurement and the fourth location measurement are distinct and selected from at least one of a FTM, and UWB measurement, and an absolute positioning measurement.

Aspect 13. The network device of any of Aspects 10 to 12, wherein the absolute positioning measurement comprises a satellite geolocation measurement or a communication network measurement using network entities with known geolocations.

Aspect 14. The network device of any of Aspects 10 to 13, wherein the processor is configured to execute the instructions and cause the processor to: determine a line-of-sight quality associated with the first location measurement based on a channel impulse response (CIR) of the first location measurement.

Aspect 15. The network device of any of Aspects 10 to 14, wherein the trigger comprises at least one of a channel occupancy threshold and a time determined based on channel occupancy over a recorded unit of time.

Aspect 16. The network device of any of Aspects 10 to 15, wherein the processor is configured to execute the instructions and cause the processor to: determine a distance between the first AP and the second AP based on a satellite location measurement of the first AP and the second AP; determine a horizontal dilution of the satellite location measurement of the first AP and the second AP; and determine whether one of the first location measurement, the second location measurement, the third location measurement, or the fourth location measurement are outside a range associated with the distance and the horizontal dilution.

Aspect 17. The network device of any of Aspects 10 to 16, wherein the processor is configured to execute the instructions and cause the processor to: receive a message indicating a third AP has joined in a network including the first AP and the second AP; provide instructions to the third AP to measure a plurality of location measurements based on at least one of the first AP and the second AP; and determine a third location associated with the third AP based on the plurality of location measurements, the first location associated with the first AP, and the second location associated with the second AP.

Aspect 18. The network device of any of Aspects 10 to 17, wherein based on the plurality of location measurements of the third AP, determine a second confidence of the first weight, the second weight, the third weight, and the fourth weight; and determine whether to perform the additional location measurements based on the second confidence of the first weight, the second weight, the third weight, and the fourth weight.

Aspect 19. A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: receive a first location measurement associated with a first measurement variant and a second location measurement associated with a second measurement variant from a first AP; receive a third location measurement associated with the first measurement variant and a fourth location measurement associated with the second measurement variant from a second AP; determine a first weight associated with the first location measurement, a second weight associated with the second location measurement, a third weight associated with the third location measurement, and a fourth weight associated with the fourth location measurement; determine a first location associated with the first AP and a second location associated with the second AP based on the first weight, the second weight, the third weight, and the fourth weight; determine a confidence of the first location based on a comparison of the first location measurement and the second location measurement; identify a trigger to perform additional location measurements of the first AP and the second AP; and perform the additional location measurements of the first AP and the second AP based on the trigger.

Aspect 20. The computer readable medium of Aspect 19, wherein the first location measurement and the second location measurement are distinct and selected from at least one of a fine tune measurement (FTM), and ultrawideband (UWB) measurement, and an absolute positioning measurement.

Aspect 21. The computer readable medium of any of Aspects 19 to 20, wherein the third location measurement and the fourth location measurement are distinct and selected from at least one of a FTM, and UWB measurement, and an absolute positioning measurement.

Aspect 22. The computer readable medium of any of Aspects 19 to 21, wherein the absolute positioning measurement comprises a satellite geolocation measurement or a communication network measurement using network entities with known geolocations.

Aspect 23. The computer readable medium of any of Aspects 19 to 22, wherein the processor is configured to execute the computer readable medium and cause the processor to: determine a line-of-sight quality associated with the first location measurement based on a channel impulse response (CIR) of the first location measurement.

Aspect 24. The computer readable medium of any of Aspects 19 to 23, wherein the trigger comprises at least one of a channel occupancy threshold and a time determined based on channel occupancy over a recorded unit of time.

Aspect 25. The computer readable medium of any of Aspects 19 to 24, wherein the processor is configured to execute the computer readable medium and cause the processor to: determine a distance between the first AP and the second AP based on a satellite location measurement of the first AP and the second AP; determine a horizontal dilution of the satellite location measurement of the first AP and the second AP; and determine whether one of the first location measurement, the second location measurement, the third location measurement, or the fourth location measurement are outside a range associated with the distance and the horizontal dilution.

Aspect 26. The computer readable medium of any of Aspects 19 to 25, wherein the processor is configured to execute the computer readable medium and cause the processor to: receive a message indicating a third AP has joined in a network including the first AP and the second AP; provide instructions to the third AP to measure a plurality of location measurements based on at least one of the first AP and the second AP; and determine a third location associated with the third AP based on the plurality of location measurements, the first location associated with the first AP, and the second location associated with the second AP.

Aspect 27. The computer readable medium of any of Aspects 19 to 26, wherein based on the plurality of location measurements of the third AP, determine a second confidence of the first weight, the second weight, the third weight, and the fourth weight; and determine whether to perform the additional location measurements based on the second confidence of the first weight, the second weight, the third weight, and the fourth weight.

What is claimed is:

1. A method of determining a location of an access point (AP), comprising:
   receiving a first location measurement associated with a first measurement variant and a second location measurement associated with a second measurement variant from a first AP;
   receiving a third location measurement associated with the first measurement variant and a fourth location measurement associated with the second measurement variant from a second AP;
   determining a first weight associated with the first location measurement, a second weight associated with the second location measurement, a third weight associated with the third location measurement, and a fourth weight associated with the fourth location measurement;
   determining a first location associated with the first AP and a second location associated with the second AP based on the first weight, the second weight, the third weight, and the fourth weight;
   determining a confidence of the first location based on a comparison of the first location measurement and the second location measurement, wherein the determining the confidence further comprising:
      determining a distance between the first AP and the second AP based on a satellite location measurement of the first AP and the second AP,
      determining a horizontal dilution of the satellite location measurement of the first AP and the second AP, and
      determining whether one of the first location measurement, the second location measurement, the third location measurement, or the fourth location measurement are outside a range associated with the distance and the horizontal dilution;
   identifying a trigger to perform additional location measurements of the first AP and the second AP; and
   performing the additional location measurements of the first AP and the second AP based on the trigger.

2. The method of claim 1, wherein the first location measurement and the second location measurement are distinct and selected from at least one of a fine tune measurement (FTM), and ultrawideband (UWB) measurement, and an absolute positioning measurement.

3. The method of claim 2, wherein the third location measurement and the fourth location measurement are distinct and selected from at least one of a FTM, and UWB measurement, and an absolute positioning measurement.

4. The method of claim 3, wherein the absolute positioning measurement comprises a satellite geolocation measurement or a communication network measurement using network entities with known geolocations.

5. The method of claim 1, wherein determining the first weight associated with the first location measurement comprises:
   determining a line-of-sight quality associated with the first location measurement based on a channel impulse response (CIR) of the first location measurement.

6. The method of claim 1, wherein the trigger comprises at least one of a channel occupancy threshold and a time determined based on channel occupancy over a recorded unit of time.

7. The method of claim 1, further comprising:
   receiving a message indicating a third AP has joined in a network including the first AP and the second AP;
   providing instructions to the third AP to measure a plurality of location measurements based on at least one of the first AP and the second AP; and
   determining a third location associated with the third AP based on the plurality of location measurements, the first location associated with the first AP, and the second location associated with the second AP.

8. The method of claim 7, further comprising:
   based on the plurality of location measurements of the third AP, determining a second confidence of the first weight, the second weight, the third weight, and the fourth weight; and
   determining whether to perform the additional location measurements based on the second confidence of the first weight, the second weight, the third weight, and the fourth weight.

9. A network device comprising:
   a transceiver;
   a processor configured to execute instructions and cause the processor to:
      receive a first location measurement associated with a first measurement variant and a second location measurement associated with a second measurement variant from a first AP;
      receive a third location measurement associated with the first measurement variant and a fourth location measurement associated with the second measurement variant from a second AP;
      determine a first weight associated with the first location measurement, a second weight associated with the second location measurement, a third weight associated with the third location measurement, and a fourth weight associated with the fourth location measurement;
      determine a first location associated with the first AP and a second location associated with the second AP based on the first weight, the second weight, the third weight, and the fourth weight;
      determine a confidence of the first location based on a comparison of the first location measurement and the second location measurement, wherein the confidence is determined by:
         determine a distance between the first AP and the second AP based on a satellite location measurement of the first AP and the second AP,
         determine a horizontal dilution of the satellite location measurement of the first AP and the second AP, and
         determine whether one of the first location measurement, the second location measurement, the third location measurement, or the fourth location measurement are outside a range associated with the distance and the horizontal dilution;
      identify a trigger to perform additional location measurements of the first AP and the second AP; and
      perform the additional location measurements of the first AP and the second AP based on the trigger.

10. The network device of claim 9, the first location measurement and the second location measurement are distinct and selected from at least one of a fine tune measurement (FTM), and ultrawideband (UWB) measurement, and an absolute positioning measurement.

11. The network device of claim 10, the third location measurement and the fourth location measurement are distinct and selected from at least one of a FTM, and UWB measurement, and an absolute positioning measurement.

12. The network device of claim 11, the absolute positioning measurement comprises a satellite geolocation measurement or a communication network measurement using network entities with known geolocations.

13. The network device of claim 9, wherein the instructions further cause the processor to:
    determine a line-of-sight quality associated with the first location measurement based on a channel impulse response (CIR) of the first location measurement.

14. The network device of claim 9, the trigger comprises at least one of a channel occupancy threshold and a time determined based on channel occupancy over a recorded unit of time.

15. The network device of claim 9, wherein the instructions further cause the processor to:
    receive a message indicating a third AP has joined in a network including the first AP and the second AP;
    provide instructions to the third AP to measure a plurality of location measurements based on at least one of the first AP and the second AP; and
    determine a third location associated with the third AP based on the plurality of location measurements, the first location associated with the first AP, and the second location associated with the second AP.

16. The network device of claim 15,
    based on the plurality of location measurements of the third AP, determine a second confidence of the first weight, the second weight, the third weight, and the fourth weight; and
    determine whether to perform the additional location measurements based on the second confidence of the first weight, the second weight, the third weight, and the fourth weight.

17. A non-transitory computer readable medium comprising instructions, the instructions, when executed by a computing system, cause the computing system to:
    receive a first location measurement associated with a first measurement variant and a second location measurement associated with a second measurement variant from a first AP;
    receive a third location measurement associated with the first measurement variant and a fourth location measurement associated with the second measurement variant from a second AP;
    determine a first weight associated with the first location measurement, a second weight associated with the second location measurement, a third weight associated with the third location measurement, and a fourth weight associated with the fourth location measurement;
    determine a first location associated with the first AP and a second location associated with the second AP based on the first weight, the second weight, the third weight, and the fourth weight;
    determine a confidence of the first location based on a comparison of the first location measurement and the second location measurement, wherein the confidence is determined by:
        determine a distance between the first AP and the second AP based on a satellite location measurement of the first AP and the second AP,
        determine a horizontal dilution of the satellite location measurement of the first AP and the second AP, and
        determine whether one of the first location measurement, the second location measurement, the third location measurement, or the fourth location measurement are outside a range associated with the distance and the horizontal dilution;
    identify a trigger to perform additional location measurements of the first AP and the second AP; and
    perform the additional location measurements of the first AP and the second AP based on the trigger.

18. The computer readable medium of claim 17, the first location measurement and the second location measurement are distinct and selected from at least one of a fine tune measurement (FTM), and ultrawideband (UWB) measurement, and an absolute positioning measurement.

19. The non-transitory computer readable medium of claim 17, the absolute positioning measurement comprises a satellite geolocation measurement or a communication network measurement using network entities with known geolocations.

20. The non-transitory computer readable medium of claim 17, wherein the instructions further cause the processor to:
    determine a line-of-sight quality associated with the first location measurement based on a channel impulse response (CIR) of the first location measurement.

* * * * *